(12) United States Patent
Ji et al.

(10) Patent No.: US 9,098,904 B2
(45) Date of Patent: Aug. 4, 2015

(54) SYSTEM AND METHOD FOR REGISTERING ULTRASOUND AND MAGNETIC RESONANCE IMAGES

(75) Inventors: Songbai Ji, Lebanon, NH (US); David W. Roberts, Lyme, NH (US); Alex Hartov, Enfield, NH (US); Keith D. Paulsen, Hanover, NH (US)

(73) Assignee: Dartmouth College, Hanover, NH (US)

( * ) Notice: Subject to any disclaimer, the term of this patent is extended or adjusted under 35 U.S.C. 154(b) by 134 days.

(21) Appl. No.: 13/885,270

(22) PCT Filed: Nov. 15, 2011

(86) PCT No.: PCT/US2011/060687
§ 371 (c)(1),
(2), (4) Date: May 14, 2013

(87) PCT Pub. No.: WO2012/068042
PCT Pub. Date: May 24, 2012

(65) Prior Publication Data
US 2014/0056498 A1 Feb. 27, 2014

Related U.S. Application Data

(60) Provisional application No. 61/413,533, filed on Nov. 15, 2010.

(51) Int. Cl.
*G06K 9/00* (2006.01)
*G06T 7/00* (2006.01)
*G06T 3/00* (2006.01)
*A61B 5/05* (2006.01)

(52) U.S. Cl.
CPC ............. *G06T 7/0024* (2013.01); *G06T 3/0068* (2013.01)

(58) Field of Classification Search
CPC .................................. G06K 9/00; G06T 7/00
USPC ......... 382/128, 129, 130, 131, 132, 133, 134; 600/407, 410, 411, 425, 427, 437; 378/4, 8, 21–27, 901
See application file for complete search history.

(56) References Cited

U.S. PATENT DOCUMENTS

| 8,605,964 B2 * | 12/2013 | Fichtinger et al. ............. 382/128 |
| 2002/0128550 A1 | 9/2002 | Van Den Brink et al. |
| 2004/0059217 A1 | 3/2004 | Kessman et al. |
| 2004/0092815 A1 | 5/2004 | Schweikard et al. |
| 2004/0138560 A1 | 7/2004 | Paladini |
| 2007/0015991 A1 | 1/2007 | Fu et al. |

(Continued)

OTHER PUBLICATIONS

Ji, Songbai; Roberts, David W.; Hartov, Alex; Paulsen, Keith D.; Combining Multiple True 3D Ultrasound Image Volumes through Re-registration and Rasterization; Med Image Comput Comput Assist Interv. Author manuscript; available in PMC Jun. 14, 2010.

(Continued)

*Primary Examiner* — Abolfazl Tabatabai
(74) *Attorney, Agent, or Firm* — Peter A. Nieves; Sheehan Phinney Bass + Green PA

(57) ABSTRACT

A system and methods are presented for emulating the appearance of prominent features captured in ultrasound through directional dilation of a magnetic resonance gradient image along a direction determined by the relative ultrasound scan-head location with respect to the magnetic resonance gradient image in order to improve the robustness and reliability of registration.

19 Claims, 5 Drawing Sheets

(56) References Cited

U.S. PATENT DOCUMENTS

| | | |
|---|---|---|
| 2008/0095421 A1 | 4/2008 | Sun et al. |
| 2008/0123927 A1 | 5/2008 | Miga et al. |
| 2008/0269604 A1 | 10/2008 | Boctor et al. |
| 2009/0080746 A1 | 3/2009 | Xu et al. |
| 2009/0097778 A1* | 4/2009 | Washburn et al. ............ 382/294 |
| 2009/0148019 A1 | 6/2009 | Hamada et al. |
| 2009/0306507 A1 | 12/2009 | Hyun et al. |
| 2009/0326363 A1 | 12/2009 | Li et al. |
| 2010/0198063 A1* | 8/2010 | Huber et al. ................ 600/437 |

OTHER PUBLICATIONS

Dekomien, Claudia; Hold, Stephanie; Hensel, Karin; Schmidz, Georg; Winter, Susanne; Registration of Intraoperative 3D ultrasound with preoperative MRI Data for Navigated Surgery-first results at the knee; Proceedings of Computer Assisted Orthopaedic Surgery (CAOS), pp. 133-136, 2007.

Dhibi, M.; Solaiman, B.; Puentes, J.; Validation of Calibration by Spatial Registration between US and MRI Scans: Applications to Carotid of Bifurcation; Information and Communication Technologies: From Theory to Applications, 2009. ICTTA 2008, vol. 7, Issue 11, Apr. 2008; pp. 1-4.

Gobbi, David G.; Comeau, Roch M., Peters, Terry M.; Ultrasound/MRI Overlay with Warping for Neurosurgery; Medical Imaging Computing and Computer-Assisted Intervention; Copyright 2000, Springer Berlin/Heidelberg, pp. 29-53.

Gobbi, David G.; Comeau, Roch M., Lee, Belinda, K.H.; Peters, Terry M.; Correlation of Pre-Operative MRI and Intra-Operative MRI and Intra-Operative 3D Ultrasound to Measure Brain Tissue Shift; Proc. SPIE 3982, Medical Imaging 2000: Ultrasonic Imaging and Signal Processing, 77 (Apr. 12, 2000).

Roche, Alexis; Pennec, Xavier; Malandain, Gregoire; Ayache, Nicholas; Rigid Registration of 3-D Ultrasound With MR Images: A New Approach to Combining Intensity and Gradient Information; IEEE Transactions on Medical Imaging, vol. 20, No. 10, Oct. 2001, p. 1038-1049.

Winter, S.; Hansen, C.; Dekomien, C.; Pechlivanis,I.; Engelhardt, M.; Ermert, H.; Schmeider, K.; Ultrasound-Based Registration of Preoperative CT or MRI Data for Navigation in Brain Surgery; Tagungsband der 6. Jahrestagung der Deutschen Gesellschaft fur Computer- und Robotergiestuzte Chirurgie; Oct. 13, 2007, p. 79-81.

Shams, R.; Sadeghi, P.; Kennedy, R.A.; Gradient Intensity: A New Mutual Information-Based Registration Method; Computer Vision and Pattern Recognition, Jun. 2007, p. 1-8.

Porter, B.C.; Rubens, D.J.; Strang, J.G.; Smith, J.; Totterman, S.; Parker, K.J.; Three-Dimensional Registration and Fusion of Ultrasound and MRI Using Major Vessels as Fiducial Markers; IEEE Transactions on Medical Imaging, vol. 20, Issue 4, Apr. 2001, pp. 354-359.

Masahiro Sakakibara, MD, PhD, Takeshi Nagashima, MD, PhD, Takafumi Sangai, MD, PhD, Rikiya Nakamura, MD, Hiroshi Fujimoto, MD, Manabu Arai, MD, Toshiki Kazama, MD, PhD, Hideyuki Hashimoto, MD, PhD, Yukio Nakatani, MD, PhD, Masaru Miyazaki, MD, PhD; Breast-Conserving Surgery using Projectionand Reproduction Techniques of Surgical-Position Breast MRI in Patients with Ductal Carcinoma In Situ of the Breast; 2008 by the American College of Surgeons: Published by Elsevier Inc.

Songbai Ji, Alex Hartov, Ziji Wu, David Roberts, Keith Paulsen: "Mutual-Information-Based Image to Patient Re-Registration Using Intraoperative Ultrasound in Image-Guided Neurosurgery", Medical Physics 35(10), pp. 4612-4624 (Oct. 2008).

* cited by examiner

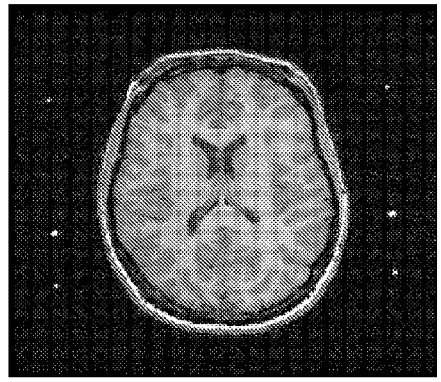
FIG. 4A
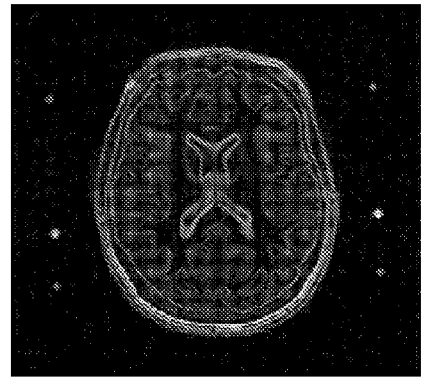
FIG. 4B
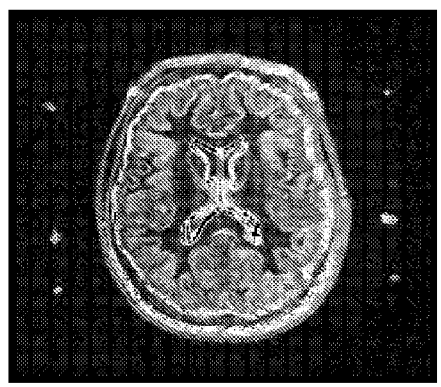
FIG. 4C
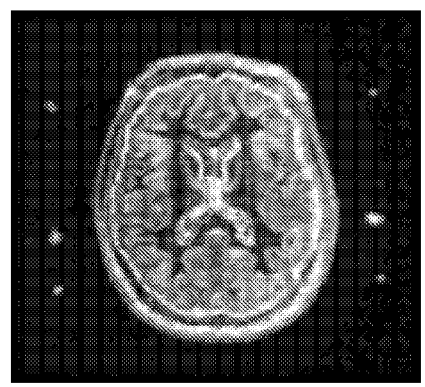
FIG. 4D
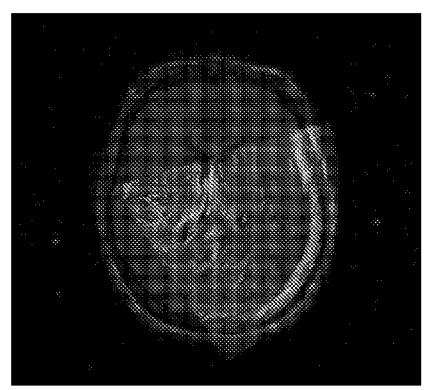
FIG. 4E
FIG. 4

US 9,098,904 B2

SYSTEM AND METHOD FOR REGISTERING ULTRASOUND AND MAGNETIC RESONANCE IMAGES

GOVERNMENT STATEMENT

This invention was made with United States government support under Contract Number RO1 EB002082-11 awarded by NIH. The United States government has certain rights in the invention.

FIELD OF THE INVENTION

The present invention relates to medical imaging, and more particularly, is related to registration of ultrasound and magnetic resonance images.

BACKGROUND

Magnetic resonance (MR) imaging is commonly used for pre-operative images. Examples of pre-operative image images include medical images acquired pre-operatively or surgical plans based on pre-operative images. Ultrasound (US) is frequently used for diagnostic and intraoperative imaging purposes. An example of intraoperative data includes medical images acquired during surgery in the operating room. It is advantageous to cross-reference pre-operative images with intraoperative images. Unfortunately, features that may be readily apparent in a pre-operative image may be difficult to discern in an intraoperative image. Likewise, features that may be readily apparent in an intraoperative image may be difficult to discern in a pre-operative image.

Image registration is the process of transforming different sets of data into one common coordinate system. The need for intraoperative registration arises because there may be an unknown spatial relationship between pre-operative images and intraoperative data in the operating room. While it may be possible to visualize a portion of the anatomy of a patient within the pre-operative medical images, and also to visualize the same anatomy using intraoperative data such as ultrasound, the precise spatial correspondence between the representations may be unknown. For example, the soft tissue of an internal organ may be displaced or deformed during surgery, making it difficult to correlate the location of a feature in an intraoperative ultrasound image to the location of the feature in a pre-operative magnetic resonance image.

Image processing and analysis involves extracting features, describing shapes and recognizing patterns. Such tasks refer to geometrical concepts such as size, shape, and orientation. Mathematical morphology uses concepts from set theory, geometry and topology to analyze geometrical structures in an image. In the context of image processing, morphology is the name of a specific methodology designed for the analysis of the geometrical structure in an image. Mathematical morphology examines the geometrical structure of an image in order to make certain features apparent, distinguishing meaningful information from irrelevant distortions by reducing the meaningful information to a simplification, or skeletonization. Such a skeleton suffices for feature recognition and can be handled much more economically than the full symbol.

The basic morphological operations, erosion and dilation, may produce contrasting results when applied to either grayscale or binary images. Erosion shrinks image objects while dilation expands them. Dilation generally increases the sizes of objects, filling in holes and broken areas, and connecting areas that are separated by spaces smaller than the size of the structuring element.

The understanding and interpretation of ultrasound images is greatly facilitated by registering the ultrasound images with images generated with other modalities, most notably, magnetic resonance imaging (MRI). As noted above, image registration is the process of transforming different sets of data into one common coordinate system. Such sets of data may be multiple photographs, data from different sensors, from different times, or from different viewpoints. Image registration is used in computer vision, medical imaging, military automatic target recognition, and compiling and analyzing images and data from satellites. Registration is necessary in order to compare or integrate the data obtained from these different measurements.

In imaging technology, a fiduciary marker, or fiducial, is an object used in the field of view of an imaging system which appears in the image produced for use as a point of reference or a measure. A fiducial may be either something placed into or on the imaging subject, or a mark or set of marks in the reticle of an optical instrument. Fiduciary markers are used in a wide range of medical imaging applications. Images of the same subject produced with two different imaging systems may be correlated by placing a fiduciary marker in the area imaged by both systems. In this case, a marker which is visible in the images produced by both imaging modalities must be used.

There are disadvantages of the fiducial marker-based registration approach. First, it may be necessary to affix the fiducial markers to the patient, for example, glued to the scalp or drilled into the skull, before the pre-operative images are acquired. This may be an invasive and costly process which may require an additional surgical procedure. Second, depending upon the type of intraoperative sensor used, the fiducial markers may need to be physically exposed during surgery, even if the markers are located far from the primary surgical site. This may result in additional blood loss and additional time required to suture the soft tissues in the vicinity of the markers. Additionally, there are instances when fiducial based registration of ultrasound images with MRI images is unsuccessful.

Therefore, there is an unmet need for registration of ultrasound images with MRI images with improved visual accuracy and greater likelihood for success than fiducial-based registration of ultrasound images with MRI images, without the costs, risks, and complexities of fiducial based registration.

SUMMARY OF THE INVENTION

Embodiments of the present invention provide a system and method for registering ultrasound and magnetic images. Briefly described, a first aspect of the present invention is directed to a method for registering an intraoperative three dimensional ultrasound image with a pre-operative intensity magnetic resonance image comprising gradient information. The method includes the steps of identifying an anatomical boundary from the gradient information, producing a filtered magnetic resonance image by processing the intensity magnetic image with an image filter, and registering the ultrasound image with the filtered magnetic resonance image, wherein the filtered magnetic resonance image simulates the appearance of an ultrasound image.

A second aspect of the present invention is directed to a method for registering a three dimensional ultrasound image with a magnetic resonance image. The method includes the steps of rasterizing a volumetric true three dimensional ultrasound image, locating an origin of the three dimensional ultrasound image in the magnetic resonance image, generating a directionally dilated gradient image of the magnetic resonance image with reference to the origin, and registering the three dimensional ultrasound image as a floating image with the dilated magnetic resonance gradient image as a fixed image.

Briefly described, in architecture, a third aspect of the present invention is directed to a system for registering a three dimensional ultrasound image with a magnetic resonance image. The system includes a memory and a processor. The processor is configured to perform the steps of identifying an anatomical boundary from the gradient information, producing a filtered magnetic resonance image by processing the intensity magnetic image with an image filter, and registering the ultrasound image with the filtered magnetic resonance image, wherein the filtered magnetic resonance image simulates the appearance of an ultrasound image.

Other systems, methods and features of the present invention will be or become apparent to persons having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principals of the invention.

FIG. 4A is an example of an axial MR image of a brain.

FIG. 4B is an example of a gradient image corresponding to the axial MR image of FIG. 4A.

FIG. 4C is an example of a dilated gradient image of a brain.

FIG. 4D is an example of a directionally dilated gradient image of a brain after Gaussian smoothing.

FIG. 4E is a two-dimensional representation of a registered volumetric true 3DUS image of a brain and an MR image of the brain.

DETAILED DESCRIPTION

Figure 1:
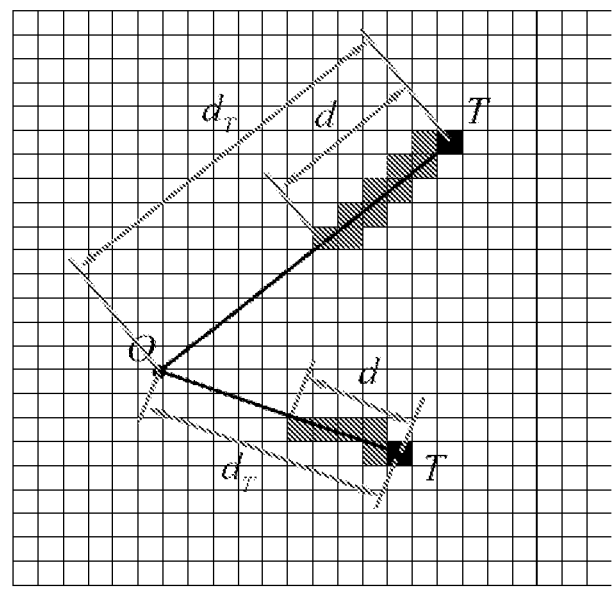
FIG. 1 is a schematic diagram illustrating directional dilation in two-dimensions.

Reference will now be made in detail to embodiments of the present invention, examples of which are illustrated in the accompanying drawings. Wherever possible, the same reference numbers are used in the drawings and the description to refer to the same or like parts.

Exemplary embodiments are presented of a technique to emulate the appearance of prominent features captured in ultrasound (US) through directional dilation of a magnetic resonance (MR) gradient image along a direction determined by the relative US scan-head location with respect to MR in order to improve the robustness and reliability of the registration. Ensuring robust and accurate registration between three dimensional ultrasound (3DUS) and MR using image-based techniques may entail applying directional dilation upon an MR gradient image to simulate the appearance of features found in 3DUS image volumes.

The following provides exemplary embodiments of use of the present system and method in the framework of image-guided neurosurgery, although it should be noted that the present invention is not limited to use in image-guided neurosurgery. This example illustrates a spatial transformation between ultrasound and magnetic resonance images. Specifically, the present description is with regard to establishing a spatial transformation between volumetric true three dimensional (3D) intraoperative ultrasound (iUS) and preoperative images (including magnetic resonance (pMR) and computerized axial tomography (CT or CAT), although the former is much more widely used to provide unparalleled delineation of soft tissues in the brain) of a patient. It should be noted that pMR is used in the present description for exemplary purposes only and is not intended to be a limitation to the present invention.

Directional Dilation

In U.S. images, anatomical features located farther from an ultrasound probe head may exhibit a distorted, or smeared, appearance in comparison with features located closer to the probe head. In order to facilitate registration, an MR image is processed to simulate the smearing of the US image being registered with the MR image. Therefore, the dilation of the MR image must take into account a point of origin of the US image, in this case, the probe head, and the distance and direction of the feature in the MR image in relation to the point of origin. The process of weighting the dilation of an image relative to the point of origin is called directional dilation.

FIG. 1 illustrates directional dilation in two-dimensions. For each voxel (T) in a Cartesian rectilinear image volume, shown as dark patches in FIG. 1, a line is drawn between the voxel and a pre-determined origin O in space. The origin O may be, for example, a US scan-head probe tip. The length of the line-segment, OT, is denoted as $d_T$. A set of voxels ($\Psi$) is identified where the set is intersected by the line-segment OT and are within a distance d relative to the target (gray patches in FIG. 1). In the dilated image, the image intensity of the target voxel is set to the intensity that is maximal over all voxels found in the set $\Psi$. Mathematically, equation one, as shown below, illustrates the directional dilation, where $I'_T$ is the image intensity value of voxel T in the dilated image, and $I_i$ is the image intensity of the ith voxel found in the set $\Psi$.

$$I'_T = \max(I_i), I_i \epsilon \Psi, \quad \text{(Eq.1)}$$

In order to better simulate the appearance of feature smearing, which may seem to be more profound in regions farther away from the scan-head probe-tip found in three dimensional ultrasound image volumes, the distance d is linearly increased, based on the distance of the target voxel relative to the origin, $d_T$. Specifically, equation 2 illustrates how dilation is scaled as a function of distance, where $\alpha$ is a constant which may be empirically chosen based on the actual three dimensional ultrasound image appearance.

$$d = \alpha \times d_T \quad \text{(Eq.2)}$$

Effectively, closer to the origin O, fewer voxels are considered in dilation for a particular target voxel. Similarly, farther away from the origin O, more voxels are considered in dilation for a particular target voxel.

Compared with traditional image dilation that can be found in many textbooks, directional dilation allows the structural elements to vary depending on the location and orientation of each voxel relative to the origin O, for example, the US scan-head probe tip. This approach may improve the simulation of the apparent appearance of features found in three dimensional ultrasound image volumes when applied to an MR gradient image, so therefore directional dilation allows more robust and accurate registration between 3DUS and MR.

Image Registration

Figure 2:
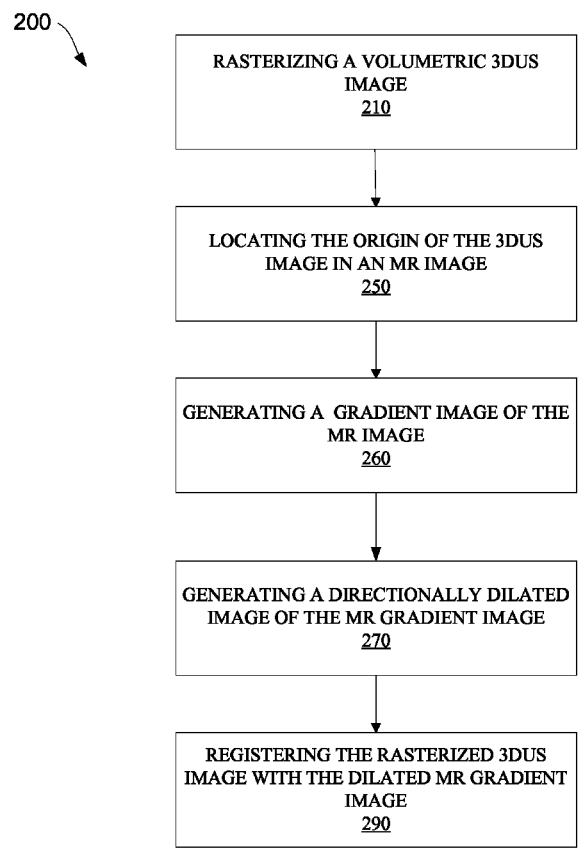
FIG. 2 is a flow chart of a first embodiment of an exemplary method for registering a 3DUS image with an MR image.

FIG. 2 is a flow chart 200 of a first exemplary embodiment of a method for registering a 3DUS image with a preoperative MR image. It should be noted that any process descriptions or blocks in flow charts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

Figure 3:
FIG. 3 is a two dimensional representation of a rasterized true 3DUS image volume.

FIG. 3, which illustrates an intraoperative US image, and FIG. 4, which illustrates a pre-operative MR image in several stages over the course of image processing, are referenced to assist in the explanation of the steps of FIG. 2. As shown by block 210, a volumetric true 3DUS image is rasterized, for example, by following the method as published by S. Ji, D. W. Roberts, A. Hartov, and K. D. Paulsen, "Combining multiple volumetric true 3D ultrasound volumes through re-registration and rasterization," G.-Z. Yang et al. (Eds.): MICCAI 2009, Part I, LNCS 5761, pp. 795-802, 2009, which is hereby incorporated by reference in its entirety.

FIG. 3 shows a typical 2D representation of a rasterized true 3DUS image volume, where smearing of features, especially in regions far away from the US scan-head probe-tip, is evident. Since US images are based on acoustic reflections, regions with high intensity normally occur at tissue boundaries. In contrast, the MR image of FIG. 4A, showing a typical axial MR image of the head of a patient, highlights soft tissue delineation. The differences in features are the result of the fundamental differences in physical mechanisms used to create the images: ultrasound employs acoustic echoes to highlight anatomical boundaries whereas image intensities in MRI directly reflect the magnetic spins excited in tissue. Since the two methods produce images that emphasize different physical features, it is difficult to correlate common reference points when registering the images. Therefore, performing filtering operations on the MR image to emphasize features highlighted in the 3DUS facilitates the registration process.

Figure 5:
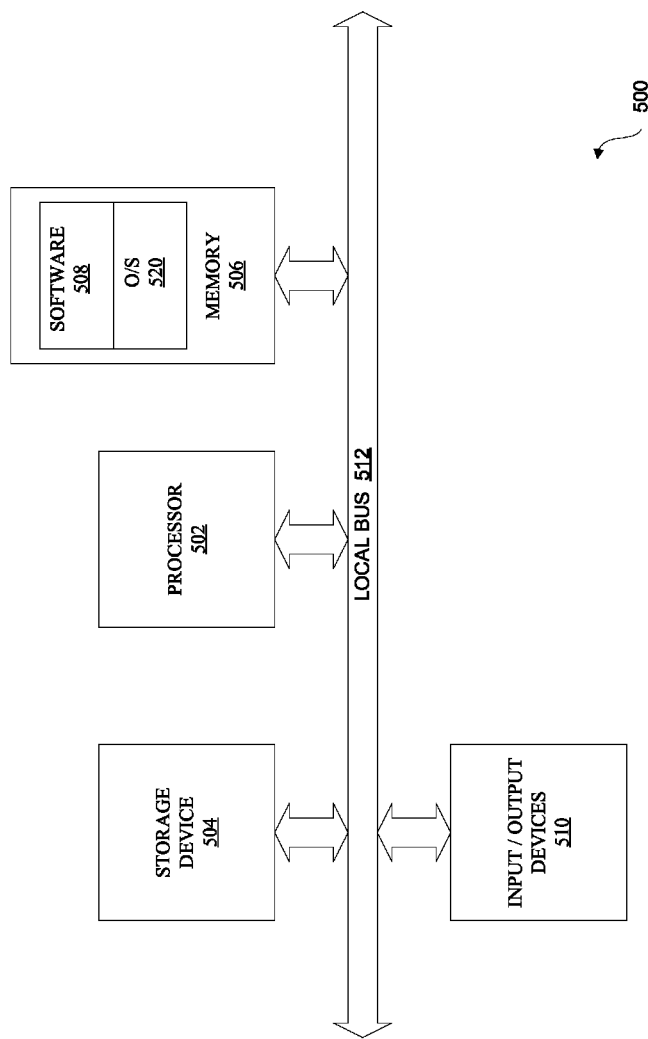
FIG. 5 is a schematic diagram of an exemplary system for executing functionality of the present invention.

Continuing with the flow chart 200 of FIG. 2, as shown by block 250, the origin of the 3DUS image is located in the MR image in preparation to modify the MR image to simulate the 3DUS image. Determining the origin of the 3DUS image in the MR image may be achieved, for example, by transforming the US scan-head probe-tip location following the initial special transformation between 3DUS and MR determined from a fiducial based patient registration. However, other methods of locating the 3DUS origin in the MR image are also possible within the scope of this disclosure. For example, the 3DUS origin may be empirically placed on the parenchymal surface near the tumor that may be segmented from the MR image, or placed at the center of a craniotomy that may be determined from pre-surgical plans. It should be noted that locating the origin may be performed by any device containing a processor and a memory, such as, for example, a general purpose computer, an example of which is illustrated by FIG. 5.

A gradient image is a directional change in the intensity or color in an image. Gradient images may be used to extract information from images. As shown by block 260, a gradient image of the intensity MR image is generated to identify anatomical boundaries.

FIG. 4B shows an example of a gradient image generated from anatomical MR of FIG. 4A to highlight tissue interfaces. Using the previously located origin as shown by block 250 as a reference, a directionally dilated gradient image of the MR gradient image is generated, as shown by block 270. Directional dilation of the gradient MR image is then performed as described above. FIG. 4C shows an example of the gradient image after directional dilation is applied to the gradient image of FIG. 4B.

Additional pre-registration processing, such as rasterization, Gaussian smoothing, thresholding, and morphology operations, may be performed in order to further improve the robustness of image registration. For example, the resulting dilated MR gradient image as well as the rasterized 3DUS image may be Gaussian-smoothed (for example, with a kernel of 5×5×5) to reduce the noise level, as shown in FIG. 4D. Registration of the 3DUS image with the dilated MR gradient image is performed, as shown by block 290. For example, the MR gradient image (FIG. 4D) may be used as the fixed image and the rasterized 3DUS (FIG. 3) image may be used as the floating image. Registration may be based on maximization of mutual information between the two image volumes. FIG. 4E shows an exemplary result of the spatial alignment between the volumetric true 3DUS image and the MR image after registration.

It should be noted that additional processing or filtering of the MR image may be employed to optimize registration with specific types of US images within the scope of this disclosure. The goal of such parameter optimization is to emphasize features in the MR image to match similar features that are inherently emphasized in an US image of the same organ. For example, manipulations of images of a neonatal brain, the heart, the liver, or the abdomen may be optimized by maximizing certain parameters such as the scaling factor, a, in Eq. 2 that is used to determine the amount of image dilation based on the relative distance to the origin. These parameter manipulations may be based on a predetermined set of parameters depending upon the target organ type, or, alternatively, may be optimized based on conditions particular to a specific US image.

While the abovementioned patient registration method is provided in the framework of image-guided neurosurgery, the present system and method is capable of being implemented in other image-guidance systems as long as registration between ultrasound and preoperative images is feasible. Non-limited examples include, but are not limited to, image-guided surgery of the liver and of the abdomen. Of course, there are other examples for implementation of the present system and method in other image-guidance systems.

System

As previously mentioned, the present system for executing the functionality described in detail above may be a computer, an example of which is illustrated by FIG. 5. The system 500 contains a processor 502, a storage device 504, a memory 506 having software 508 stored therein that defines the abovementioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a medical imaging system, such as an MR or US system, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above. The system 500 may be utilized at several times during surgery to register and re-register intraoperative US image volumes with a pre-operative MR image. Additional re-registrations may be ordered, for instance, by a surgeon as organ deformation progresses during surgery. Ideally, the registration procedure occurs in the background after the intraoperative volume is obtained, without disrupting or delaying the normal course of surgery.

In summary, a method and system is provided for improving the registration of a pre-operative MR image with an intraoperative US image by manipulating the MR image to more closely simulate features of the US image. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for registering a three dimensional ultrasound image with an intensity magnetic resonance image comprising gradient information, comprising the steps of:
   identifying an anatomical boundary from said gradient information;
   producing a filtered magnetic resonance image by processing said intensity magnetic resonance image with an image filter; and
   registering said ultrasound image with said filtered magnetic resonance image;
   wherein said three dimensional ultrasound image is an intraoperative three dimensional ultrasound image, said intensity magnetic resonance image is a pre-operative intensity magnetic resonance image, and said filtered magnetic resonance image simulates the appearance of an ultrasound image.

2. The method of claim 1, further comprising the step of adjusting a parameter of said image filter according to an ultrasound image.

3. The method of claim 2, wherein adjusting a parameter of said image filter according to an ultrasound image further comprises selecting a predetermined parameter manipulation.

4. The method of claim 3, wherein selecting a predetermined parameter manipulation is based upon an organ type.

5. The method of claim 1, wherein processing said intensity magnetic resonance image further comprises directional dilation.

6. A method for registering a three dimensional ultrasound image with a magnetic resonance image, comprising the steps of:
   rasterizing a volumetric true three dimensional ultrasound image;
   locating an origin of said three dimensional ultrasound image in said magnetic resonance image;
   generating a directionally dilated gradient image of the magnetic resonance image with reference to said origin; and
   registering said three dimensional ultrasound image as a floating image with said dilated magnetic resonance gradient image as a fixed image.

7. The method of claim 6, wherein the step of locating said origin of said three dimensional ultrasound image in said magnetic resonance image further comprises transforming an ultrasound scan-head probe-tip location.

8. The method of claim 7, further comprising the step of performing an initial special transformation between said three dimensional ultrasound image and said magnetic resonance image determined from a fiducial based patient registration.

9. The method of claim 8, wherein transforming said ultrasound scan-head probe-tip location occurs following said initial special transformation.

10. The method of claim 6, wherein the step of locating said origin of said three dimensional ultrasound image in said magnetic resonance image further comprises empirically locating said origin on a feature from the magnetic resonance image.

11. The method of claim 6, wherein the step of locating said origin of said three dimensional ultrasound image in said magnetic resonance image may be determined from pre-surgical plans.

12. The method of claim 6, further comprising the step of Gaussian-smoothing said three dimensional ultrasound image.

13. The method of claim 6, further comprising the step of Gaussian-smoothing said magnetic resonance image.

14. The method of claim 6, wherein the step of generating said directionally dilated gradient image of a magnetic resonance image with reference to said origin further comprises the steps of:
   identifying a target voxel in said magnetic resonance image;
   locating a line-segment between a target voxel and said origin;
   identifying a set of voxels intersected by said line segment within a specified distance from said target voxel; and
   adjusting an intensity of said target voxel.

15. The method of claim 14, wherein the step of adjusting further comprises setting said intensity of the target voxel to a maximal intensity of all voxels in said set of voxels.

16. The method of claim 14, further comprising the step of scaling said specified distance as a function of a distance between said target voxel and said origin.

17. A computer program product, comprising a computer usable medium having a computer readable program code embodied therein, said computer readable program code adapted to be executed to implement a method for registering a three dimensional ultrasound image with a magnetic resonance image, said method comprising the steps of:
   identifying an anatomical boundary from said gradient information;
   producing a filtered magnetic resonance image by processing said intensity magnetic resonance image with an image filter; and
   registering said ultrasound image with said filtered magnetic resonance image;
   wherein said filtered magnetic resonance image simulates the appearance of an ultrasound image.

18. A computer program product, comprising a computer usable medium having a computer readable program code embodied therein, said computer readable program code adapted to be executed to implement a method for registering a three dimensional ultrasound image with a magnetic resonance image, said method comprising the steps of:
   rasterizing a volumetric true three dimensional ultrasound image;
   locating an origin of said three dimensional ultrasound image in said magnetic resonance image;
   generating a directionally dilated gradient image of the magnetic resonance image with reference to said origin; and
   registering said three dimensional ultrasound image as a floating image with said dilated magnetic resonance gradient image as a fixed image.

19. A system for registering a three dimensional ultrasound image with a magnetic resonance image, comprising:
   a memory; and
   a processor configured to perform the steps of:
      identifying an anatomical boundary from said gradient information;
      producing a filtered magnetic resonance image by processing said intensity magnetic resonance image with an image filter; and
      registering said ultrasound image with said filtered magnetic resonance image;
   wherein said filtered magnetic resonance image simulates the appearance of an ultrasound image.

* * * * *